United States Patent Office 3,083,148
Patented Mar. 26, 1963

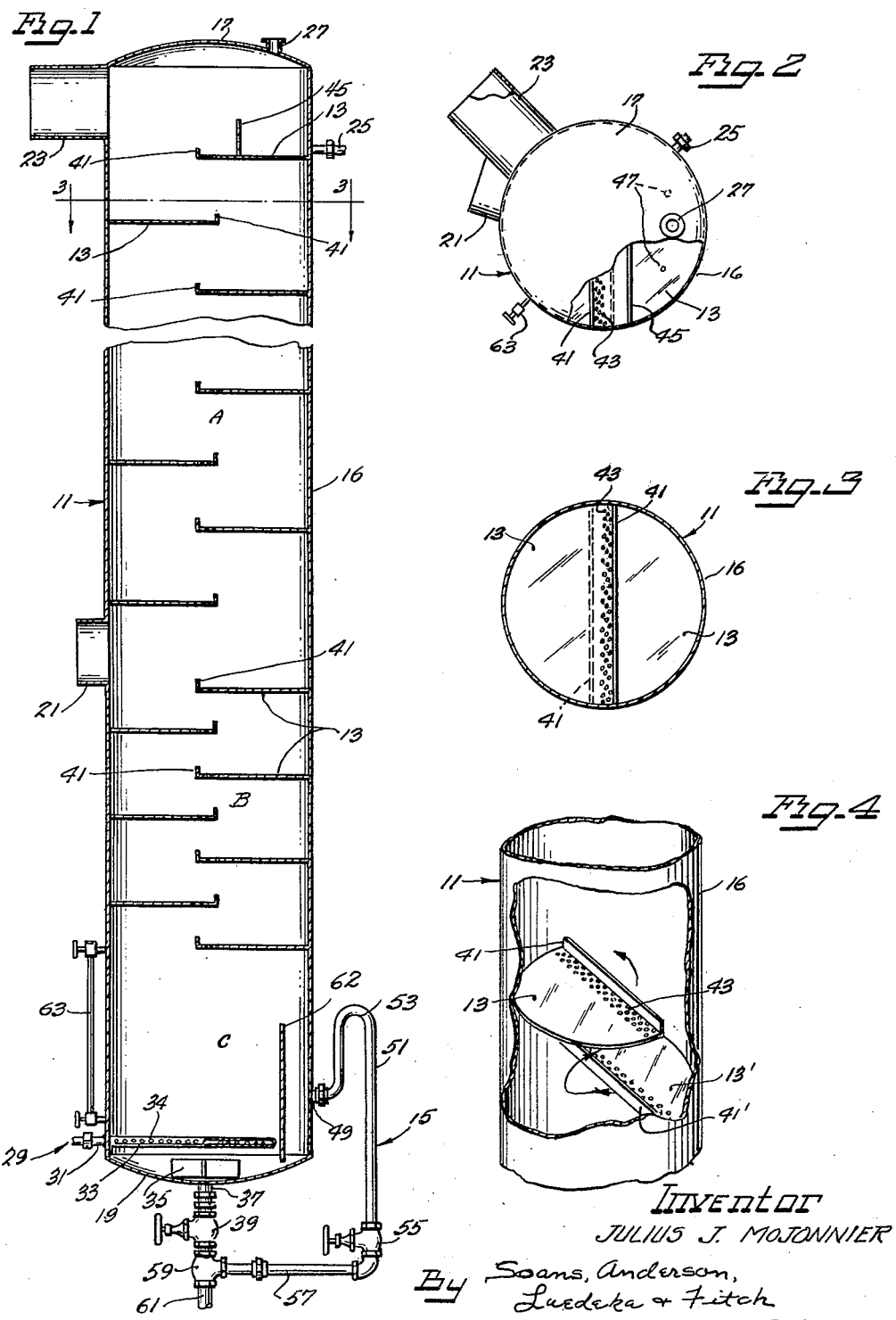

3,083,148
FRACTIONATION COLUMN
Julius J. Mojonnier, Winfield, Ill., assignor to
Mojonnier Bros. Co., Chicago, Ill.
Filed Oct. 10, 1960, Ser. No. 61,484
1 Claim. (Cl. 202—158)

The present invention relates to apparatus for contacting liquid with vapor in a vertical column and more particularly it relates to apparatus for fractionally distilling a more volatile component from a less volatile component.

Distillation columns, as well as columns used in absorption processes, have been known and described in the prior art. An important requirement is that either type of column furnish an efficient and effective contact between liquid and vapor streams which pass through the column. In some processes it is desirable that the liquid stream flow downwardly through the column and the vapor stream flow upwardly through the column, thereby providing countercurrent operation. In other processes it is desirable to employ concurrent operation, in which the vapor stream passes downwardly through the column; that is, in the same direction as the liquid stream.

In order that a column operate efficiently various means have been employed to provide a large contact area at the interfaces between the liquid and the vapor streams. One such means has been the use of packing materials having a large surface area. Thus, it is known to use a column packed with rings, saddles, and the like. However, these packings give rise to a relatively large pressure drop through the column, thus limiting the capacity of the column. Furthermore, these packings furnish a multitude of crevices wherein liquid and degradation products tend to collect, thereby making it difficult to thoroughly clean the column upon shutdown.

A second type of contacting means involves the use of trays which serve to collect the liquid and allow passage of the vapor stream therethrough. Examples of this type of contacting means are the bubble cap tray and the sieve tray. This second type of contacting means gives a lower pressure drop through the column than does packing, thereby providing increased column capacity. However, numerous "dead spots" exist, in this second type, where undesirable materials may collect to make cleaning difficult.

A third type of contacting means employs a series of baffles which direct the liquid downwardly in a series of cascades, and which direct the vapor in a tortuous path through the cascades. In general, baffles do not provide the contact efficiency which either packings or trays provide. However, the use of baffles as contacting means results in the lowest pressure drop of any of the three types, and allows rapid cleaning of the column upon shutdown.

In numerous fields, such as the food processing field, it is highly desirable that a column, whether it be used for distillation or absorption, have relatively few places where liquid can collect, and decompose or otherwise deteriorate. Particularly in the food processing field, it is also highly desirable that the column drain quickly upon shut down and be readily cleanable thereafter, in order to maintain sanitary conditions therein without the necessity of a dismantling operation. At the same time, the column should display good contact efficiency and have a high capacity.

Heretofore, attempts to provide a column having these characteristics have not been entirely satisfactory. The use of any of the three types of contacting means described above has been deficient in one or more respects.

It is an object of the present invention to provide improved apparatus for contacting a liquid stream with a vapor stream. Another object of the present invention is to provide apparatus for the fractional distillation of a more volatile component from a less volatile component. Another object of the present invention is to provide a column for contacting a liquid stream with a vapor stream, which drains readily and which may be maintained in a sanitary condition without dismantling. Still another object of the present invention is to provide a column for contacting a liquid stream with a vapor stream, which has a relatively low pressure drop and a relatively high contact efficiency.

Other objects and advantages of the present invention will become apparent by reference to the following description and to the accompanying drawings, in which:

FIGURE 1 is a sectional view of the column embodying the principles of the present invention;

FIGURE 2 is a top view, partially broken away, of the column shown in FIGURE 1;

FIGURE 3 is a sectional view, taken along lines 3—3 of FIGURE 1; and

FIGURE 4 is a fragmentary perspective view, partly broken away, of a representative portion of the column shown in FIGURE 1.

Referring now to the drawings, it will be seen that the embodiment chosen to illustrate the principles of the present invention comprises, generally, a vertical column 11 having a rectifying section A, a stripping section B, and a reboiler section C. In the column 11 are plurality of superimposed pooling baffle trays 13 disposed within the column, and a liquid level control assembly 15.

The column 11 comprises a cylindrical shell 16 whose ends are closed by an upper head 17 and a lower pan 19. It will be understood, of course, that the cylindrical design of the shell 15 is chosen on the basis of practical considerations and not because it is essential to the operation of the present invention. The column 11 is preferably stainless steel or other corrosion-resistant material, in order that the column may be more easily cleaned and maintained in a sanitary condition.

The column 11 further comprises a feed inlet 21 disposed in the shell 16 intermediate the upper head 17 and the lower pan 19. An overhead vapor outlet 23 is provided in the shell adjacent the upper head 17. A reflux inlet 25 is provided in the shell, also adjacent the upper head 17. A wash down inlet 27 is provided in the upper head 17 for cleaning purposes.

A steam injector assembly 29 is provided in the reboiler section C of the column 11. The steam injector assembly comprises a suitable steam inlet connection 31 in the shell 16 adjacent the lower pan 19, and a sparger 33 disposed within the column 11. The sparger includes a horizontal tube, closed at one end, which extends diametrically across the column 11 and contains a plurality of holes 34 through which live steam may be introduced to the column. The holes 34 are disposed in a horizontal plane on opposite sides of the sparger 33 on either side of the axis of the column 11 (i.e. in the half of the tube nearer the inlet 31 the holes 34 are only on one side of the tube and in the other half the holes 34 are only on the opposite side of the tube), whereby the steam imparts a circular swirling movement of the liquid in the reboiler section C. It will be understood, of course, that other heating means, such as an enclosed steam coil or an external heat exchanger, may also be used to provide the required amount of heat to the reboiler.

A swirl breaker 35 is provided adjacent the bottom head 19 of the column. The swirl breaker is fabricated from rectangular plates or pieces of stainless steel or the like to form a cross and is disposed so each plate extends radially of the axis of the column 11. The swirl breaker serves to resist the circular swirling motion of liquid in the reboiler section C of the column 11, and hence induces turbulence thereof.

The column 11 further comprises a drain outlet line 37 located in the center of the lower pan 19. A drain valve 39 is in communication with the drain outlet line 37.

Each of the pooling tray baffles 13 comprises a plate of stainless steel or the like, and, as seen particularly in FIGURE 3, has a shape somewhat greater than a semicircle. Thus, each pooling tray baffle 13 has an arcuate edge and a generally straight edge. Each pooling tray baffle is horizontally disposed within the column 11 with its arcuate edge abutting the shell 16 and its straight edge being a free edge which extends across the column. It will be seen that each pooling tray baffle extends across somewhat more than one-half the cross-sectional area of the shell 16.

A dam 41 extends along the free edge of each pooling tray baffle 13, with its ends abutting the shell 16 of the column 11. Immediately adjacent the dam 41 are a plurality of openings 43 in the pooling tray baffle 13 which extend along lines generally parallel to the dam 41.

It will be seen in FIGURE 1 that the pooling tray baffles 13 are disposed in alternating fashion along the vertical axis of the column 11; that is, the free edges of successive pooling tray baffles are generally parallel to each other but lie on opposite sides of a plane lying along the diametrical axis of the column. Thus, as seen particularly in FIGURE 3, there is an overlap of successive pooling tray baffles. It is important that the openings 43 in the pooling tray baffles be located within this overlap, as will become evident hereinafter.

The pooling tray baffle 13 which is uppermost in the column is disposed beneath the reflux inlet 25. A reflux weir 45 extends across this pooling tray baffle intermediate the reflux inlet and the dam 41 on the pooling tray baffle, thereby providing a reservoir for collection of reflux. Weep holes 47 are provided in the uppermost pooling tray baffle for drainage of the collected reflux upon shutdown of the column. However, these holes are of such size that there is build-up of liquid which, in operation of this column, overflows the weir 45.

The liquid level control assembly 15 comprises a bottoms product outlet 49 in the shell 16 in the reboiler section C of the column. Connected to the bottoms product outlet by suitable fittings is an overflow loop 51. The apex 53 of the overflow loop is positioned at the height at which the liquid level within the reboiler section C is desirably maintained. A bottoms product valve 55 is connected to the other end of the overflow loop, whereby withdrawal of the bottoms product may be terminated if necessary. The outlet side of the bottoms product valve 55 is connected to a pipe 57 which in turn is connected to one leg of a T 59. A second leg of the T 59 is in communication with the drain outlet line 37 through the drain outlet valve 39, which were previously described. The third leg of the T is connected to a pipe 61 which conducts the bottoms product to appropriate processing or disposal means.

A reboiler baffle 62 extends across the shell 16 of the column adjacent the bottoms product outlet, and serves to minimize surging of liquid through the bottoms product outlet which might otherwise result. A space is provided between the reboiler baffle 62 and the lower pan of the column 19 to allow drainage of liquid upon shutdown of the column.

A sight glass 63, with appropriate fittings, is connected to the shell 16 at the reboiler section C to enable observation of the liquid level therein. It will be recognized, of course, that manual control of the liquid level may be effected by means of the sight glass 63 and the drain outlet valve 39 if it is so desired.

Apparatus constructed in accordance with the principles of this invention is capable of achieving efficient contact of liquid with vapor in both absorption operations and distillation operations. However, the described embodiment is especially adaptable for and has been very advantageously used in connection with the concentration, by fractional distillation, of flavor and aroma essence components from fruit juice. In this process, a filtered, unconcentrated fruit juice is flash distilled to provide a stripped vapor. This stripped vapor, which contains substantially all of the essence components, is introduced to a fractionation column, where the flavor and aroma essence components, which have a lower boiling point than that of water, are concentrated and removed in the distillate. The operation of the present invention will be particularly described with respect to this operation, but it will be understood that the invention is not confined to use therewith.

Under equilibrium conditions, a vapor feed from a still (not shown) continuously enters the column 11 through the feed inlet 21 and provides a stream of vapor flowing upwardly through the column. As it flows upwardly, the vapor stream contacts a downwardly flowing stream of liquid. The pooling tray baffles 13 serve to interrupt the downward flow of liquid and to redistribute the liquid in successive liquid-vapor contact stages. The pooling tray baffles 13 also serve to direct the vapor stream in a sinuous path through the contact stages. The manner in which the pooling tray baffles 13 interrupt the flow of liquid and provide liquid-vapor contact stages is an important feature of the present invention, and will be more fully set out hereinafter.

To continue the general description of the operation of the present invention, the vapor stream becomes progressively enriched with the more volatile components of the feed as it passes upwardly through the rectification section A of the column.

Upon leaving the rectification section A, the enriched vapor passes outwardly from the column 11 through the overhead vapor outlet 23 and thence to a condenser (not shown). The vapor is condensed to a liquid in the condenser, and the condensate then passes to a reflux splitter (not shown). In the reflux splitter, the condensate stream is split into two portions, one of which is returned to the column 11 through the reflux inlet 25 as liquid reflux. The other portion of the condensate is removed to another step in the process as the distillate product.

The liquid reflux provides the downwardly flowing liquid stream referred to hereinbefore, and the liquid stream is contacted in successive stages with the upwardly flowing vapor stream. When the liquid stream leaves the rectification section A, it is appreciably depleted of its more volatile components. The liquid stream then passes into the stripping section B of the column 11, which lies beneath the feed line 21.

In the stripping section B, the liquid stream is further contacted with an upwardly flowing stream of vapor, and is stripped of substantially all of its more volatile components. The liquid is then collected in the reboiler section C of the column, where its level is automatically held at a predetermined level by the liquid level control assembly 13.

In order that the operation of the pooling tray baffles 13 may be more clearly understood, reference may be made to FIGURE 4, which shows in perspective, with portions of the shell broken away, two representative pooling tray baffles 13 and 13'; which comprise a single contact stage.

It will be seen that the alternating arrangement of the upper pooling tray baffle 13 and the lower pooling tray baffle 13' causes the upwardly flowing vapor stream to follow a sinuous path between the pooling tray baffles as indicated by the arrows.

The downward flow of the liquid stream is interrupted by the upper pooling tray baffle 13, and the dam 41 on the pooling tray baffle causes a pool of liquid to collect upon the upper surface of the pooling tray baffle 13. Under the hydraulic pressure, caused by the pool of liquid, the liquid passes through the openings 43 and flows downwardly therefrom in a plurality of small streams, thereby providing a discontinuous curtain of flowing liquid entirely across the column 11. The curtain of flowing liquid is interrupted at the lower pooling tray baffle 13', where a pool of liquid is also built up by the dam 41', and the liquid cycle is repeated.

As described hereinbefore, the vapor stream is directed between the pooling tray baffles 13 and 13', and thereby is caused to flow through the discontinuous curtain of downwardly flowing liquid. Intimate contact between the vapor stream and the liquid stream is thereby obtained, resulting in good contact efficiency.

The height of the dam 41 above the surface of the pooling tray baffle 13 is desirably small, in order that the liquid inventory in the column be minimized. For example, in the illustrated embodiment, comprising a 36 inch diameter shell, the height of the dam 41 is ¾ inches. A further advantage of a low dam is that a greater free area between the pooling tray baffles is thereby obtained for vapor flow therethrough.

The size and number of openings 43 in each pooling tray baffle 13 are suitably chosen to maintain a pool of liquid upon each baffle whose depth is somewhat less than the height of the dam 41. The liquid loading to be carried in the column 11 must also be taken into consideration. In the illustrated embodiment, which is designed for a liquid loading of 2,100 pounds per hour, 5 rows of ⅛ inch holes are provided, with each row on ⅞ inch centers, and each hole on ½ inch centers.

It will be noted that the column 11 is adapted to drain rapidly upon shutdown. In this respect, each pooling tray baffle 13 drains rapidly and thoroughly through the openings 43, there being no necessity to provide weep holes for drainage. In addition, the column 11 contain a minimum of "dead" spaces wherein liquid or products of decomposition can collect. Thus, the column 11 may be rapidly and effectively cleaned and sanitized after a short period of drainage by introducing a suitable cleaning solution through the wash down inlet 27.

It will be seen that the wash down inlet 27 is located directly above the uppermost pooling tray baffle 13 in the column 11, and behind the reflux weir 45, where the reflux stream is collected. This reflux reservoir in the column is drained through the weep holes 47, hereinbefore described, thereby preventing a true dead spot in the column. However, the location of the wash down inlet enables cleaning solution to be conducted directly into the reflux reservoir, and allows rapid dissipitation of residual material therefrom.

Another feature of the present invention is its relatively high capacity. Flow of vapor through the discontinuous curtain of flowing liquid between the pooling tray baffles is against relatively low resistance. A low pressure drop is thereby obtained. Furthermore, it will be noted that, even if the column 11 is loaded sufficiently to cause overflow of liquid from the pooling tray baffles 13 over the dams 41, the column 11 will continue to function as a conventional baffle column. The contact efficiency, of course, will be decreased, but flooding of the column will not result therefrom. Thus, the maximum capacity of the column 11 is comparable to the capacity of a conventional baffle column.

Thus, there has been provided apparatus for efficiently and effectively contacting a liquid stream with a vapor stream in a distillation column, which has the additional advantages of a relatively high capacity and adaptability for rapid and effective drainage and cleaning. It will be apparent from the foregoing description that modifications of the illustrated embodiment may easily be made to adapt it for other processes. For example, minor modifications will allow concurrent operation as in absorption operations. This and other modifications which will be apparent to those skilled in the art, are within the scope of the present invention.

Various of the features of the present invention are set out in the following claim.

What is claimed is:

A liquid-vapor contacting column having a generally cylindrical vertical shell which column includes an upper liquid-vapor contact section and a lower reboiler section for containing a quantity of boiling liquid, said upper section comprising at least an upper and a lower horizontal pooling tray baffle disposed within the shell in vertically spaced relation, each extending across a portion of the cross section of the shell and thereby providing a free edge on each pooling tray baffle, a dam extending across each pooling tray baffle adjacent the free edge thereof, said free edge of said lower baffle being generally parallel to said free edge of said upper baffle and lying in a vertical plane which intersects said upper baffle, means disposed above said upper baffle for directing a stream of liquid onto said upper tray baffle, each pooling tray baffle having a plurality of openings formed therein located adjacent said dam for flow of liquid therethrough, thereby providing a discontinuous curtain of flowing liquid between said pooling tray baffles, and means connected to said column below said lower baffle for directing a stream of vapor through the curtain of flowing liquid, said lower reboiler section including means for inducing controlled turbulence in the contained liquid, which means comprises, in combination, a conduit sparging means for injecting steam into the liquid including a horizontal tube closed at one end and extending diametrically across said column below the level of the liquid and swirl-breaking means disposed below said sparging means, said tube having a first half portion disposed on one side of the vertical axis of said column and a second half portion disposed on the other side of the vertical axis of the column, said first half portion having a plurality of holes located in a horizontal plane and only on one side of said tube so that steam is discharged therefrom only in a single direction, said second half portion having a plurality of holes located in a horizontal plane and only on the opposite side of said tube so that steam is discharged therefrom only in a single direction opposite to said direction of the steam from said first half portion whereby steam injected into the liquid through said holes in said sparging means induces circular swirling movement of the liquid, said swirl-breaking means comprising a plurality of vertically disposed plate members extending radially of the vertical axis of the column so that said swirl-breaking means resists circular swirling movement of the liquid and creates controlled turbulence.

References Cited in the file of this patent

UNITED STATES PATENTS

| | | |
|---|---|---|
| 403,117 | Leighton | May 14, 1889 |
| 732,548 | Guillaume | June 30, 1903 |
| 980,108 | Lillie | Dec. 27, 1910 |
| 1,598,858 | Greenawalt | Sept. 7, 1926 |
| 1,951,497 | Wallis | Mar. 20, 1934 |
| 2,012,571 | Kutcher | Aug. 27, 1935 |
| 2,023,227 | Henkel et al. | Dec. 3, 1935 |
| 2,592,904 | Jackson | Apr. 15, 1952 |
| 2,725,343 | Lambert | Nov. 29, 1955 |
| 2,730,468 | Martin | Jan. 10, 1956 |
| 2,934,326 | Strand | Apr. 26, 1960 |
| 2,939,685 | Worn et al. | June 7, 1960 |

FOREIGN PATENTS

| | | |
|---|---|---|
| 3,644 | Great Britain | of 1889 |
| 206,804 | Great Britain | Apr. 9, 1924 |